G. W. HIBBARD.
Feather-Dusters.

No. 154,985.                          Patented Sept. 15, 1874.

WITNESSES.
J. H. Lawlor
Frederick A. Herring

INVENTOR
George W. Hibbard
By Gridley & Warner
Attys

UNITED STATES PATENT OFFICE.

GEORGE W. HIBBARD, OF GENEVA, WISCONSIN, ASSIGNOR TO WILLIAM H. CURWIN, CHARLES J. SAUTER, AND WILLIAM W. CLARK, OF CHICAGO, ILLINOIS.

IMPROVEMENT IN FEATHER DUSTERS.

Specification forming part of Letters Patent No. 154,985, dated September 15, 1874; application filed June 26, 1874.

*To all whom it may concern:*

Be it known that I, GEORGE W. HIBBARD, of Geneva, in the county of Walworth and State of Wisconsin, have invented a new, useful, and Improved Feather Duster, of which the following is a full, clear, and exact description, which will enable others skilled in the art to which my invention appertains to make and use the same, reference being had to the accompanying drawing forming a part hereof, and in which—

Figure 1:
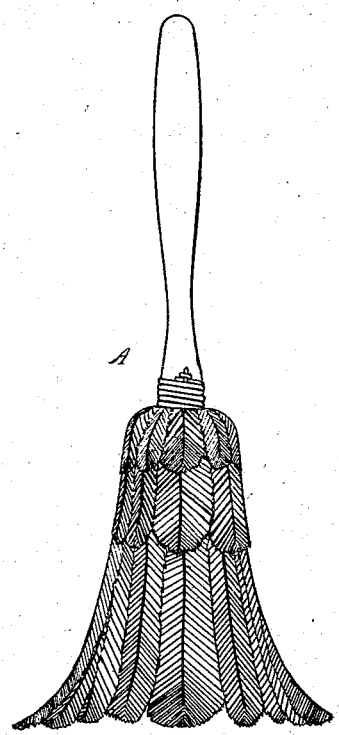
Figure 2:
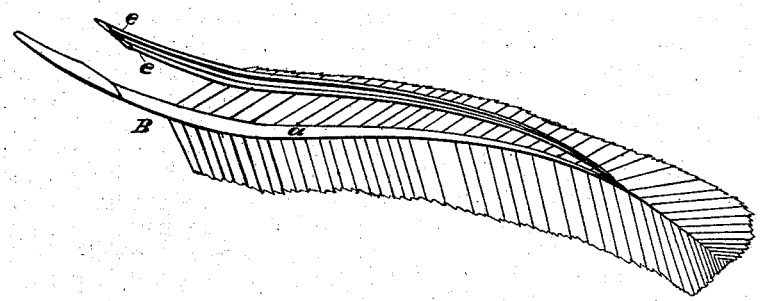

Figure 1 represents a feather duster embodying my invention; and Fig. 2, a perspective view of one of the feathers employed in the construction of the duster, showing the manner in which it is prepared for that purpose.

Heretofore various kinds of feathers have been employed in the construction of dusters, the chief object being, in selecting feathers for this purpose, to obtain those which are long and pliable, and therefore not liable to be easily broken when the duster is used for the purpose for which it is intended. The long feathers of ostriches and peacocks, such, for example, as are obtained from the wings and tail, have been found useful for this purpose, for the reason that the stems are slender and pliable. The feathers of other birds have also for a like reason been found to be applicable for this purpose; but feathers of this class are comparatively rare, and large dusters made of them are, therefore, too expensive for general use. The long feathers of turkeys and of some other birds have stems sufficiently stiff to render the latter liable to be readily broken by being bent. Yet, dusters have been made of feathers of the latter class, which are comparatively abundant and cheap; but these brushes have been made comparatively short and stubby to prevent the feathers from being injured in the manner described.

The object of my invention is to render pliable feathers of the class last referred to, so that they may be employed with advantage in the construction of dusters; and to that end my invention consists of a feather duster made of feathers rendered pliable by being split away, substantially as hereinafter specified.

In the drawing, A represents a feather duster embodying my invention. B is a feather like those of which the duster is made. The feather B is one of a class too stiff to be used for the purpose set forth without the disadvantages referred to. Upon the under side of the stem *a* is a growth consisting of two stiff ridges, *e e*, which prevent the stem from being bent without rendering it liable to be broken. These ridges I split away, as represented in Fig. 2, and then sever them from the stem near the slender part of the latter. By this means the feather is rendered pliable, and may be bent considerably without being liable to be broken.

A number of feathers thus prepared are arranged together in the usual manner, for the purpose of forming a duster, as represented in Fig. 1. I prefer to employ turkey-feathers for the purpose set forth, for the reason that they are large, common, and cheap; but I do not here intend to confine myself thereto, as other stiff feathers may also be rendered pliable, in the manner and for the purposes set forth.

A duster thus made will be pliable, cheap, and durable, and may be made large and graceful in design.

Having thus described my invention, what I claim as new, and desire to secure by Letters Patent, is—

A new article of manufacture consisting of a feather duster, wherein the stems of the feathers are split longitudinally, and a part thereof severed from the remaining part, substantially as and for the purposes specified.

GEORGE W. HIBBARD.

Witnesses:
N. C. GRIDLEY,
C. J. SAUTER.